United States Patent Office 3,470,468
Patented Sept. 30, 1969

3,470,468
SYNTHESIS AND WAVE GENERATION WITH COMPACTLY CARRIED WAVEFORMS
Peter H. Halpern, Sarasota, Fla., assignor to Melpar, Inc., Falls Church, Va., a corporation of Delaware
Filed July 6, 1965, Ser. No. 469,443
Int. Cl. G01r 23/16, 27/02
U.S. Cl. 324—77       15 Claims

ABSTRACT OF THE DISCLOSURE

Synthesis and analysis of compactly carried waveforms is performed by a circuit in which the voltage across and current through a frequency determining element of each of a plurality of filter sections of different resonant frequencies, related to the odd harmonic Fourier coefficients of the compactly carried waveform as applied to an input terminal to which all of the filter sections are coupled, are detected and converted to respectively related values of the same parameter for subsequent summation.

---

The present invention relates generally to filter networks and more particularly to networks for synthesizing and matching compactly carried waveforms.

Network for synthesizing compactly carried waveforms are discussed on pages 717–723 in the book, "Synthesis of Passive Networks," by E. A. Guilleman, published by Wiley & Sons, 1957. It is there stated that a compactly carried waveform is a time varying function, $f_c(t)$, having a finite value over a predetermined time interval $0 < t < T$ and that vanishes for all other values of $t$. The odd periodic extension, $f(t)$, of compactly carried waveform $f_c(t)$ is by definition:

$$f(t) = f_c(t),\ 0 < T < t$$
$$f(t) = -f_c(t+T),\ \text{for all values of } t.$$

In other words, the odd periodic extension of $f_c(t)$ is a periodic wave having a period of $2T$ in which the first and second halves of each cycle are identical in shape with $f_c(t)$; but the values in the first and second half cycles are of opposite polarity. As an example of a compactly carried wave, consider $F_c(t) = \sin wt + \sin 3wt$ where $0 < wt < \pi$ and $F_c(t) = 0$ for $t < 0$, $t > \pi$. The odd periodic expansion, $F(t)$, of $F_c(t) = \sin wt + \sin 3wt$ for all $t$. That this example fits the above definition may be seen by substituting $wt = \pi/3$ in $F_c(t)$, $F(t)$, and $F(t+\pi)$. Thus $F_c(\pi/3) = F(\pi/3) = \sqrt{3/2}$ and $F(4\pi/3) = -\sqrt{3/2}$.

The odd periodic extension $f(t)$ of $f_c(t)$ is so denominated because the usual Fourier expansion of $f(t)$, having a period $2T$, contains only odd harmonics. That is, $$f(t) = \Sigma_{n,\ \text{odd}} \left[ A_n \sin \frac{n\pi}{T} t + B_n \cos \frac{n\pi}{T} t \right] \quad (1)$$

where $A_n$ and $B_n$ are the Fourier coefficients of the $n^{\text{th}}$ sine and cosine terms, respectively. It is to be recalled that $$A_n = \frac{1}{\pi} \int_0^{2\pi} f(t) \sin nt\, dt \quad (2)$$

and $$B_n = \frac{1}{\pi} \int_0^{2\pi} f(t) \cos nt\, dt \quad (3)$$

According to the present invention, there is provided a network in which the time varying Fourier coefficients $A_n$ and $B_n$ are derived or are analyzed for a network input signal, $V_{in}(t)$, wherein the coefficients prevail over the interval $t$ to $t+T$. Thus, the network is, in effect, continuously deriving or analyzing the Fourier coefficients of a compactly carried waveform having period $T$ over all values of $t$.

The transfer function $Q(s)$ of such a network may be expressed as:

$$Q(s) = \frac{2F_1(s)}{1 + sF_2(s)} \quad (4)$$

where:

$s$ is the LaPlace operator, $$F(s) = \int_0^\infty f(t) \epsilon^{-st} dt$$

$F_1(s)$ is the LaPlace transform of the Fourier expansion of the odd periodic extension $f(t)$ of compactly carried waveform $f_c(t)$;

$F_2(s)$ is the LaPlace transform of the Fourier expansion of a periodic square wave having period $2T$ and unit amplitude.

If the odd periodic extension $f(t)$ of $f_c(t)$ is expanded as shown by Equation 1 supra, then substitution for $F_1(s)$ and expansion of $F_2(s)$ into Equation 2 gives $$Q(s) = \frac{\Sigma_{n,\ \text{odd}} \dfrac{A_n + B_n s}{s^2 + \left(\dfrac{n\pi}{T}\right)^2}}{1 + \Sigma_{n,\ \text{odd}} \dfrac{\dfrac{4s}{T}}{s^2 + \left(\dfrac{n\pi}{T}\right)^2}} \quad (5)$$

It can be shown that a network having this transfer function is a filter having a multiplicity of resonant sections. Each section has a different resonant frequency that is related to the frequency component of each odd harmonic Fourier coefficient. Each $A_n$ and $B_n$ term is derived by determining the voltage across and current through a capacitance in each section.

For synthesizing any compactly carried waveform over the interval $0 < t < T$, an impulse is applied to a network of the type described. The resulting compactly carried sinusoidally shaped voltages across and currents through each of the capacitances are summed together after appropriately valued coefficients are introduced.

The response of a similar network can be utilized as a match for a noisy, compactly carried input signal. For matching a compactly carried waveform $f(t)$ that extends only over the interval $t$ to $t+T$, the network impulse response should be designed to be $f(T-t)$, in the interval $t$ to $t+T$, and zero at all other times, i.e., the filter impulse response is of the same shape as the compactly carried waveform but the shape is reversed in time sequence from the waveform. Because such a network provides a compactly carried response, it is easily utilized for pulse signal matching or recognition purposes. When the coefficients for the input to the summing device are correctly selected to match the received compactly carried signal, the compactly carried signal is, in effect, auto-correlated to provide maximum response.

Because the network of the present invention is capable of recognizing noisy signals, it can be utilized in a secure communication link where signal is purposely masked with Gaussian noise.

Another use of the present invention resides in the field of signal bandwidth reduction. In such an instance, the signal to be analyzed is continuously applied to the network at a transmitter. The capacitance voltage and current are periodically sampled once every $T$ seconds to derive signals indicative of the Fourier coefficients of the analyzed wave over the just precluded sampling interval. A receiver responsive to the signals includes a similar network to the one at the transmitter. The receiver network input is impulsed synchronously with the information received to derive compactly carried waveforms having harmonically related periods. The amplitudes of the derived harmonically related waves are varied in response to the Fourier coefficient indicating signals and the modified waves are summed to provide a close replica of the signal originally applied to the transmitter analyzer.

The present invention can also be used for matching signals subject to variations in waveform, so called adaptive filters. In such an instance, a receiver with a number of control filters constructed according to the present invention are provided. The outputs of the control filters are arranged to provide cross correlation functions with the input signal, which cross correlation functions are to either side of the received signal auto-correlation. The cross correlation functions deriving from the control filters are compared to control coefficients set into a controlled filter. Thereby, the controlled filter response is adjusted to coincide with the impulse function of the received signal so that its output is always substantially the auto-correlation function of the received signal.

It is accordingly an object of the present invention to provide a new and improved network capable of synthesizing and analyzing compactly carried waveforms.

It is another object of the present invention to provide a new and improved network capable of synthesizing and analyzing waveforms only over a specified time interval.

It is a further object of the invention to provide a network for deriving the Fourier coefficients of a wave for only a specified time interval.

It is another object of the invention to provide a new and improved matched filter.

Another object of the invention is to provide a matched filter for analyzing compactly carried waveforms.

Still another object of the invention is to provide a new and improved signal bandwidth compression system.

Yet a further object of the invention is to provide a bandwidth compression system wherein Fourier coefficients are periodically derived to represent the signal being analyzed.

Still an additional object is to provide a new and improved secure communication system.

Yet a further object of the invention is to provide a new and improved matched filter that remains matched to input waveforms that are subject to variations.

The above and still further objects, features and advantages of the present invention will become apparent upon consideration of the following detailed description of one specific embodiment thereof, especially when taken in conjunction with the accompanying drawings, wherein:

FIGURE 1 is a circuit diagram illustrating a preferred embodiment of the basic component utilized in the present invention;

FIGURE 2 is a circuit diagram of another embodiment of the basic component of the invention;

FIGURE 3 is a circuit diagram illustrating still another embodiment of the invention;

FIGURE 4 is a circuit diagram illustrating the high Q filter utilized in FIGURE 3;

FIGURE 5 is a system block diagram illustrating how the present invention is utilized as a secure communication system;

FIGURE 6 is a system block diagram illustrating the manner by which the present system is utilized for signal recognition;

FIGURE 7 is a system block diagram illustrating how the present invention is utilized as a bandwidth compression device; and FIGURE 8 is a block diagram showing the manner by which the present invention may be utilized for continuously obtaining a match with a signal having a waveshape that is subject to variations.

Reference is now made to FIGURE 1 of the drawings wherein is provided filter 10 having a series of LC sections, each of which is resonant to a different frequency and connected in parallel with resistor 11, having value R. Resistance 11 connects each of the $n$ (generally on the order of 10) series resonant circuits to input terminal 12 to which may be applied a continuously time varying input or an inpulse input, such as derived by differentiating a square wave. The values of the inductance and capacitance in the resonant sections are given by:

$$L_k = \frac{TR}{4} \quad (6)$$

$$C_k = \frac{4T}{k^2\pi^2 R} \quad (7)$$

i.e.

$$L_k C_k = \frac{T^2}{k^2\pi^2}$$

where $k$ is every odd integer between 1 and $(2n+1)$, inclusive; $T$ is the interval for which the network of FIGURE 1 derives a compactly carried waveform; and $\pi = 3.1416$.

Each of the $n$ networks includes voltage and current sensing or sampling networks 13, 14 for respectively deriving signals indicative of the voltage across its particular capacitor as well as the current flowing through the capacitor. Since each of networks 13, 14 is identical, description of the networks for the first filter section comprising inductance L1 and capacitance C1 suffices. Current sampling network 14 comprises a grounded base PNP type transistor 15, having its emitter directly connected to capacitance C1 and its base forward biased by the negative potential applied to it by battery 16. The collector of transistor 15 is connected through load resistor 17 to the negative biasing potential at terminal 18. Since the impedance across the base-emitter junction of transistor 15 is very low, on the order of 20 ohms in a typical embodiment, the transistor inserts virtually no impedance into the branch comprising capacitance C1 and inductance L1. The collector current flowing in transistor 15 is directly proportional to the current flowing in the resonant section comprising L1 and C1 so the voltage developed across load resistor 17 is directly proportional to the current in the investigated branch.

The voltage across resistor 17 is coupled to variable resistor 19, at the input of summing amplifier 21, via isolating, emitter follower transistor circuit 22.

An indication of the voltage across capacitor C1 is derived by means of voltage sensing circuit 13 in which the base of common collector (i.e., emitter follower) transistor 23 is connected to the junction of inductance L1 and capacitance C1. The emitter of transistor 23 is connected to ground through load resistor 24. The voltage developed across load resistor 24 is coupled through variable resistor 25 to an input of summing amplifier 21. As is well known, the transistor emitter follower configuration provides approximately unity voltage gain, no phase reversal, and isolation between input and output terminals by virtue of its relatively high input impedance and low output impedance. Accordingly, the voltages taken from the emitters of both transistors 22 and 23 are approximately those voltages appearing at the respective base electrodes of the transistors, and the desired sensing function is provided by the respective circuit 13, 14 with virtually no disturbance of magnitude of the parameter whose value is to be sensed.

Summing amplifier 21, in addition to being provided with variable resistance inputs, contains both positive and negative signal input terminals. Thereby, appropriate polarities and coefficient values for the summed signals deriving from the outputs of the filter sections are provided.

It can be shown that the transfer functions between terminal 12 and the input terminal of voltage sampling circuit $13_k$ at any time $t$ after the impulse input is given by:

$$V_{in}/V_{c_k} = \left[ \frac{\dfrac{1}{s^2 + \dfrac{k^2\pi^2}{t^2}}}{1 + \Sigma_{n,\,odd} \left( \dfrac{\dfrac{4s}{t}}{s^2 + \dfrac{n^2\pi^2}{t^2}} \right)} \right] \quad (8)$$

while the transfer function between terminal 12 and the input to current sampling network $14_k$, $V_{in}/I_{c_k}$, may be expressed as:

$$\frac{V_{in}}{I_{c_k}} = \frac{1}{R} \left[ \frac{\dfrac{4}{t} \cdot \dfrac{1 \cdot s}{s^2 + \dfrac{k^2\pi^2}{t^2}}}{1 + \Sigma_{n,\,odd} \left( \dfrac{\dfrac{4s}{t}}{s^2 + \dfrac{n^2\pi^2}{t^2}} \right)} \right] \quad (9)$$

Comparison of Equations 8 and 9 with Equation 5 reveals that the former is of substantially the same form as the latter. The numerators of Equations 8 and 9 represent the $A_n$ and $B_n$, terms respectively, in Equation 5. By summing, in amplifier 21, the responses derived from the several networks 13 and 14, an output is derived from the amplifier indicative of a network having the transfer response indicated in Equation 5. Thus, the network between terminal 12 and the output of amplifier 21 has an impulse function that is a compactly carried waveform over the interval T, i.e. if an impulse is applied to terminal 12, the output of amplifier 21 is a waveform having a duration T, which waveform includes $n$ odd harmonic components of the resonant frequency of the first filter section.

The magnitudes of the various harmonic components in the compactly carried waveform are determined by the values of the variable input resistors to amplifier 21 as well as the polarity of the voltages applied to the amplifier. If the signal applied to terminal 12 is a noisy pulse having a duration T, equal to the compactly carried response period of the filter network, the values of the variable resistors at the input of summing amplifier 21 may be adjusted to provide a match between the output signal of amplifier 21 and the actual signal, without noise, received at terminal 12. If the values of the input resistors to summation amplifier 21 are selected so that the response of the filter network is matched with the input signal, the summation amplifier 21 output is an auto-correlation of the network response or the signal applied thereto. When the auto-correlation function occurs, amplifier 21 output is of maximum value so that an input applied to terminal 12, even though noisy, may be recognized and distinguished from other inputs.

The circuit of FIGURE 1 can also be utilized for deriving the Fourier coefficients of a continuous wave applied to terminal 12, said Fourier coefficients extending over a time interval T and being variable in response to variations of the input applied at terminal 12. The values of the Fourier coefficients $A_n$ and $B_n$ as defined by Equations 2 and 3 are derived at the outputs of networks 13 and 14. The Fourier coefficients extend only over the past T seconds of the signal applied to terminal 12 because the filter network has a finite "memory" that extends only over that interval. Any signals applied previously to the last T seconds are cancelled because the filter parameters are selected to derive a compactly carried waveform.

It can be shown that the low pass filter network of FIGURE 1 can be transformed into a bandpass filter network having similar characteristics by employing the transformation $$s = \frac{s_1^2 + \omega_0^2}{2s_1}$$

where $\omega_0$ is the center angular velocity of the band pass filter, that is $\omega_0 = 2\pi f_0$, where $f_0$ is the center frequency of the filter network. This is accomplished in the circuit of FIGURE 2.

The $k^{th}$ filter section in FIGURE 2, where $k$ is selectively every odd integer between 1 and $2n+1$, comprises a series circuit including inductance $L_{k0}$ and capacitance $C_{k0}$, both of which are connected to the parallel combination of $L_{k1}$ and $C_{k1}$. The values of the series inductances and capacitances are equal in each section to:

$$L_{k0} = \frac{TR}{8} \quad (10)$$

$$C_{k0} = \frac{8}{TR\omega_0^2} \quad (11)$$

The values of $C_{k1}$ and $L_{k1}$ are different for each filter section as represented by:

$$C_{k1} = \frac{2T}{k^2\pi^2 R} \quad (12)$$

$$L_{k1} = \frac{k^2\pi^2 R}{2\omega_0^2 T} \quad (13)$$

i.e. $L_{k1}C_{k1} = 1/\omega_0^2$.

It is noted that the inductance capacitance product of each parallel resonant circuit is the same, $1/\sqrt{\omega_0^2}$, so that the resonant frequency $\omega_0$ for each filter section is the same.

The $A_k$ Fourier coefficients of the input signal are derived by sampling the voltage across the tank circuit including $L_{k1}$ and $C_{k1}$, by circuit $13_k$, that is the same as circuit $13_1$ of FIGURE 1. The current in the resonant branch comprising $L_{k1}$ and $C_{k1}$ is derived by connecting the junction of these two elements together to the signal input terminal of circuit $14_k$, that is identical with circuit $14_1$ of FIGURE 1. The output of network $14_k$ in FIGURE 2, thereby represents the Fourier coefficients $B_k$ in Equation 3. Because the transformation $$s = \frac{s_1^2 + \omega_0^2}{2s_1}$$

was made in FIGURE 2, the series inductance and capacitance $L_{k0}$ and $C_{k0}$ can be adjusted to introduce a factor $e^{at}$ that exactly compensates for the losses introduced by the coils in the circuit, which losses are generally represented by $e^{-at}$.

Reference is now made to FIGURE 3 of the drawings wherein the series filter arrangements of FIGURES 1 and 2 are replaced by odd harmonically related parallel filters 31–36 which are preferably of the active, high Q type. Each of filters 31–36 has a transfer function that is represented by:

$$F_k = \frac{\dfrac{k^2\pi^2}{T^2}}{s^2 + \dfrac{k^2\pi^2}{T^2}} \quad (14)$$

where $k$ is selectively every odd integer between 1 and 11. Thus, each of filters 31–36 has essentially the same transfer function as a resonant circuit, and the resonant frequencies of filters 31–36 are represented by the ratios 1:3:5:7:9:11. Parallel filters 31–36 are responsive to the output of differentiator 37, the input of which is coupled to the signal derived from summing amplifier 38. One input of summing amplifier 38 is connected to square wave source 39, having an oscillation period equal to 2T, where T is defined supra.

Each of the other six inputs to summing amplifier 38 is a separate one of the signals deriving from filters 31–36. In response to the leading edge of the first square wave generated by source 39, a positive impulse is supplied by differentiator 37 to each of sections 31–36. The outputs of sections 31–36 are zero prior to application of the impulse, hence have no effect on the signal deriving from amplifier 38. The impulse deriving from differentiator 37 shocks each of filters 31–36 into oscillation at its resonant frequency. The waves now deriving from sections 31–36 are combined in amplifier 38 with the constant amplitude signal deriving from source 39. When the trailing edge of the output pulse of source 39 occurs, the voltage deriving from each of filters 31–36 is again zero. As a result of the operation of differentiator 37 a negative impulse is applied to filters 31–36. The negative impulse causes filters 31–36 to ring at different amplitudes than when they were shocked by the positive impulse because of the residual charge existing in the capacitances constituting the frequency response determining elements of the various filters.

The input resistors to summing amplifier 38 are adjusted so that the filter outputs are zero over the second half cycle of the square wave deriving from source 39. When the leading edge of the square wave again occurs, there is no stored energy in filters 31–36 and the same operation occurs. Cancellation of the waveforms derived by filters 31–36 during the second half cycle of the square wave is necessary and is accomplished by the external feedback network comprising summing amplifier 38, because filters 31–36 are isolated from each other, and cannot, by themselves, produce a compactly carried waveform. With the feedback network employed, however, the effect is exactly the same as would be derived with the filter networks of FIGURES 1 and 2, provided substantially square waves are applied by source 39 to the input of summing amplifier 38.

Each output of filters 31–36 is applied in parallel through variable coefficient adjusting resistors 41 to summing amplifiers 42 and 43. As in the case of amplifier 21, amplifiers 42 and 43 include positive and negative input terminals so that the inputs thereof may be adjusted in polarity to be both positive and negative. The output of summing amplifier 43 is applied to differentiator 44 to introduce the $s$ term that accompanies $B_n$ in the transfer function of the numerator of Equation 5. The output signal deriving from summation amplifier 42 represents the $A_n$ terms in Equation 5.

The outputs of summation amplifier 42 and differentiator 44 are combined in summing network 45, the output of which is coupled via a transmitter to a receiver (not illustrated). The wave deriving from summation amplifier 45 is a compactly carried wave having a finite value only over the interval T, which wave includes only the odd harmonics between the first and the eleventh of the square wave deriving from source 39.

By varying the values of resistors 40 and 41, the amplitudes of the various harmonics applied to summing amplifiers 42 and 43 are varied. Thus, it is possible to synthesize any compactly carried waveform having a period T with the apparatus shown in FIGURE 3. Of course, the compactly carried waveform repeats itself with a frequency of 1/2T because the network is effectively impulsed in response to only the leading edge of the square wave deriving from source 39.

The circuit for receiving and analyzing the wave transmitted from summation amplifier 45 of FIGURE 3 may take substantially the same form as any of the circuits illustrated in FIGURES 1, 2 or 3. In the case of a receiver taking a form substantially like that shown in FIGURE 3, the received, compactly carried waveform is applied to the input of summing amplifier 38 instead of square wave source 39. In all other respects, the receiver is identical with the circuit illustrated in FIGURE 3.

If the receiver Fourier coefficients, as determined by the values of variable resistors 40 and 41 therein, are exactly the same as the coefficients set in by the values of similarly denominated resistances of the transmitter of FIGURE 3, the receiver output from summation amplifier 45 consists of a series of triangular waves that comprise the auto-correlation function of the transmitter, or receiver impulse response. This is true even though the signal transmitted is received with considerable noise masked thereon.

Reference is now made to FIGURE 4 of the drawings wherein there is illustrated a preferred embodiment of one of the high Q active filters 31–36. The filter employs no inductances and has the resonant circuit transfer function indicated by Equation 14, supra. Filter input signal at terminal 51 is applied in parallel to resistor 52 and capacitance 53 via resistor 54, that has the same value as resistor 52. The other terminals of resistor 52 and capacitor 53 are connected across the network including capacitor 55 and resistor 56, the junction of which is connected to ground via capacitor 57, and are also connected across the base-emitter junction of PNP transistor 58, the collector of which is biased by the negative supply at terminal 59 through load resistor 61. The voltage developed across load resistor 61 is fed to the base-emitter junction of NPN transistor 62, having its collector connected to the positive voltage at terminal 63 via load resistor 64. A positive feedback path is provided between the base and emitter of transistor 58 through the collector of transistor 62.

By selecting $C_{55}=1/2C_{57}=1/2C_{53}$ and $$G_{56}=3/2(G_{52}+G_{57})=3G_{54}$$

where:

$C_{53}$ = the capacity of capacitor 53
$C_{55}$ = the capacity of capacitor 55
$C_{57}$ = the capacity of capacitor 57
$G_{52}$ = the conductance of resistor 52
$G_{54}$ = the conductance of resistor 54
$G_{56}$ = the conductance of resistor 56
$G_{57}$ = the conductance of resistor 57 the network transfer function becomes:

$$F=\frac{\frac{G_1 G_2}{G_1+G_2}}{\frac{C_1 C_2}{G_3}s^2+\frac{G_1 G_2}{G_1+G_2}} \qquad (15)$$

It is noted that Equation 15 is of substantially the same form as Equation 14. To provide the variable $k$ factors associated with each of filters 31–36, it is necessary only to provide differing values for resistors 56, 52 and 54 in the various filters and there is no need to change the value of capacities 53, 55 and 57 for the different filters.

Reference is now made to FIGURE 5 of the drawings wherein there is illustrated an embodiment of the present invention whereby secure binary signal transmission may be derived. Narrow, positive sync pulses of period 2T are applied by source 71 to terminal 12 of the filter circuit disclosed in FIGURE 1 or 2, as represented in FIGURE 5 by block 72. In the alternative, block 72 can be the network illustrated in FIGURE 3 wherein a square wave is supplied to summing amplifier 38.

The six output ports of filter 72 are applied through resistors 73–78 to an input terminal of summing amplifier 79. Each of resistors 74–78 is of constant value while the value of resistance 73 is varied in response to the voltage deriving from gated monostable multivibrator 81. Multivibrator 81 is operated synchronously with the derivation of the compactly carried wave by filter 72 since source 71 is connected to the gate input of monostable 81.

In response to binary information that occurs simultaneously and at the same frequency as sync pulses 71, monostable multivibrator 81 provides an output that is one of two values while the compactly carried waveform is being derived from network 72. When a binary one signal is applied to monostable multivibrator 81, which has a reset time equal to T, the value of resistance 73 is driven to a predetermined value so that one series of compactly carried waveforms is derived from summing amplifier 79. When a binary zero is applied to the information input of monostable 81, the value of resistor 73 is varied to a second predetermined value and the output of summation amplifier 79 changes correspondingly. The signal deriving from amplifier 79 is masked, to a great extent, by the Gaussian noise supplied to it by source 82 through resistor 83. Thus, it is impossible by visual inspection and virtually all other prior art filter techniques with which I am familiar to distinguish the two compactly carried waveforms that may be derived in response to variation of resistance 73.

The noisy signal deriving from summation amplifier 79 is applied via a transmission link comprising transmitter 88 and antenna 84 to antenna 85 and receiver 86 at a remote station. The wave form detected by receiver 86, including the Gaussian noise introduced by source 82, is applied to filter network 87 that is preferably of the same construction as filter 72.

The waveforms emanating from the six output ports of filter 87 are applied through resistors 91–96 and 101–106 to summing amplifiers 107, 108, respectively. Each of resistors 92–96 and 102–106 has exactly the same value as the corresponding resistor 74–78 connected between five of the output ports of filter 72 and the input of summing amplifiers 79. Resistor 91 is selected to have a value equal to the value of resistor 73 when monostable multivibrator 81 is in a binary one state while resistor 101 is selected to have a value equal to resistor 73 when the monostable is in the other state.

The outputs of summing amplifiers 107 and 108 are auto-correlation functions of the impulse responses associated with their respective input networks and the received signal. The output of summing amplifier 107 is the auto-correlation of the impulse response of the transmitter synthesizer when resistance 73 is of one value and the output of summation amplifier 108 is the auto-correlation function of the impulse response of the transmitter when resistor 73 is the other value. Comparison and greatest signal indicating network 109 selects which of the signals deriving from amplifier 107 and 108 is greatest to determine what the binary information at the transmitter is for the bit involved.

As an example, assume that a binary one is applied to monostable 81. When this occurs, the wave applied to network 87 is auto-correlated with the response of the network including resistors 91–96 and summation amplifier 107, the output of which is greater than the output derived from amplifier 108. The opposite situation occurs when a binary zero sets resistor 73 to a value equal to resistor 101. Thus, when a binary 0 is applied to gated monostable multivibrator 81 at the transmitter, a signal is derived only on output lead 111 of comparator 109 while a binary one applied to the gated monostable multivibrator results in a signal being generated only on output lead 112 of the comparator.

The techniques employed in FIGURE 5 are readily expanded into a signal recognition device as indicated in FIGURE 6. In FIGURE 6, it is desired to ascertain when the signal applied to filter 121 has a predetermined waveshape. The values of variable resistors 122 at the output ports of filter network 121, which is preferably of the type shown in FIGURE 1 or FIGURE 2, are set to match the waveshape of the desired waveform. When such a match occurs, the output of summation amplifier 123, responsive to the signals applied to resistors 122, is of maximum value. This value, equal to the auto-correlation function of the network response, remains above a predetermined value even though considerable noise is present in the signal applied to filter network 121.

To determine if the signal deriving from summation amplifier 123 is above or below the predetermined value, threshold detector 124 is provided. The level of detector 124 is set at the predetermined value so that an output is derived from it only when the signal applied to filter 121 contains the desired waveshape. The output of detector 124 is applied to indicator 125 which may be of any conventional type to indicate the presence of the predetermined waveshape at the network input.

Reference is now made to FIGURE 7 of the drawings wherein there is disclosed apparatus by which the present invention may be utilized for compressing the bandwidth of an input signal applied to a transmitter on line 131. The transmitter includes a multiport filter 132 such as shown in FIGURE 1 except that neither a summing amplifier, nor the resistances associated therewith are provided.

The multiport outputs of filter 132 are periodically sampled and stored in sample and hold network 133 that is responsive to the impulses applied thereto on lead 134. The period of the pulses on lead 134 is exactly equal to the period of the compactly carried wave form duration of filter 132. Thereby, the signals stored in network 133 are constant over each interval T and represent the $A_n$ and $B_n$ Fourier coefficients of the various odd harmonic components of the wave applied by lead 131 to filter 132 over the previous T second time interval. Each time a pulse is applied to network 133 by lead 134, the previously stored coefficient is erased and the coefficient for the preceding T second period is stored in network 133.

The $2n$ output signals deriving from sampling network 133, which are constant over each interval T, are supplied to a receiver via lines 135, along with synchronizing pulses that are applied to the receiver by way of line 136. The synchronizing pulse on lead 136 is applied to input port or terminal 12 of filter network 137 that is constructed with inductances and capacitances having exactly the same parameters as those in filter network 132. Thus, there is derived from the $k^{th}$ output port of filter network 137 a compactly carried sinusoidal wave, having period T, for the $k^{th}$ harmonic for the synchronizing wave train. Associated with the $k^{th}$ sinusoidal wave deriving from network 137 is a further sinusoidal wave of identically the same frequency as the first wave but displaced in phase by 90°.

The $2n$ output ports of filter 137 are connected to the inputs of summing amplifier 138 by variable resistances 139. The values of resistances 139 are controlled in response to the signals on leads 135, indicative of the Fourier coefficients $A_n$ and $B_n$ of the wave applied to filter 132 on lead 131. The output signal deriving from summing amplifier 138 is thereby a reasonable replica of the wave on lead 131 over each T second interval. Because there are discrete jumps in the wave generated by summing amplifier 138 at each boundary interval when a synchronizing pulse occurs, low pass filter 141 is provided at the summing amplifier output.

Reference is now made to FIGURE 8 of the drawings wherein there is disclosed an adaptive filter system embodying the principles of the present invention. An adaptive filter is one capable of varying its own impulse response in response to its input signal so that its response is always virtually matched with the signal being tracked at input lead 151. The signal being tracked is applied by lead 151 to multiport filter 152, of the type illustrated in FIGURES 1 and 2, except that neither the summing amplifiers nor the resistors are provided as in those figures. The signals deriving from the output ports of filter 152 represent the Fourier coefficients of the odd harmonics of the wave applied to filter 152 over the interval T. Each of the signals emanating from the $2n$ output ports of filter 152 is coupled in parallel to variable resistors 153, 154 and 155 to an input terminal of summing amplifiers 156, 157 and 158, respectively.

Initially, resistors 153 at the input of summing amplifier 156 are matched identically with the wave form applied at the input port of filter 152 so that maximum response is derived from summing amplifier 156. Each of resistors 154 differs by a predetermined increment δ from the initial values of resistors 153 while resistors 155 at the input terminals of amplifier 158 differ from each of resistors 153 by the same increment δ, but in the opposite direction. If the initial value of the first resistor in bank 153 is given as $R_a$, the first resistors in banks 154 and 155 have values $R_a+\delta$, and $R_a-\delta$, respectively. Thereby, the outputs of amplifiers 157 and 158 are initially set at a slight mis-match from the signal applied to the input port of filter 152, and these mis-matches are considered virtually identical in opposite directions. Hence, the outputs of amplifiers 157 and 158 are of substantially identical values, which are compared in threshold comparator 159.

As long as the signal on lead 151 remains of the same wave shape as it had initially, maximum output is derived from amplifier 156 and no output is derived from comparator 159. As the signal on lead 151 deviates from its initial value, the response of amplifier 156 decreases while the response of one of the amplifiers 157 and 158 increases and the response of the other amplifier decreases. When the relative outputs of amplifiers 157 and 158 exceed a predetermined difference in a first direction, a positive, predetermined voltage is derived from threshold comparator 159 on lead 161. The predetermined voltage thereby derived by comparator 159 is of positive value equal to $+\delta/2$. In a similar manner, a negative voltage of $-\delta/2$ is derived on output lead 162 of comparator 159 when the voltage deriving from amplifier 158 exceeds that generated by amplifier 157 by predetermined value.

Start signals on leads 161 and 162 are applied through synchronizer 163 as control voltages for resistors 153, 154 and 155. Synchronizer 163 applies its input signal to one of each of the resistors in each of groups 153–155. The time during which the synchronizer applies the control voltages is equal exactly to the period of the compactly carried wave of filter 152.

To describe the manner by which the circuit of FIGURE 8 operates, consider the situation where a $+\delta/2$ signal is derived from comparator 159 on lead 161. Such a voltage indicates that the values of resistors 154 are more closely matched to the Fourier coefficients of the received wave than are the Fourier coefficients set in by the values of resistances 155. The $\delta/2$ voltage is applied to the first resistor in each of resistor banks 153, 154 and 155 through synchronizer 163, in such a manner as to increase the value of the first resistor in bank 153 to $Ra+\delta/2$, increase the value of the first resistance in bank 154 to $Ra+3\delta/2$ and increase the first resistance in bank 155 to $Ra-\delta/2$.

The process then continues during the next compactly carried wave interval for the second resistor in each of banks 153–155 in response to the comparison output of network 159. As would be the case for the first resistance in each of banks 153–155, the values of the second resistances are increased or decreased by the predetermined value $\pm\delta/2$, dependent upon the output of comparator 159. The sequence is repeated continuously, thereby varying the gains of each amplifier 156, 157 and 158 so that slowly varying changes in the character of the signal applied on lead 151 to filter network 152 may be matched by the varying values of the resistances at the input of amplifier 156, i.e. by varying the Fourier coefficients of the matching network to be the same as the Fourier coefficients of the input wave to the system.

I claim:

1. A system for deriving and analyzing a signal only over a time period T comprising an input terminal responsive to a voltage source, said voltage being of constant value for a signal deriving system and of variable value for a signal analyzing system, $n$ networks responsive to the voltage at said input terminal, each of said networks having a pair of output terminals, the transfer function between said input terminal and one of the output terminals of the $k^{\text{th}}$ one of said networks being $$Q(s) = \frac{\dfrac{1}{s_2+\dfrac{k^2\pi^2}{T^2}}}{1+\Sigma_{n,\,\text{odd}}\left(\dfrac{4s}{s^2+\dfrac{n^2\pi^2}{T^2}}\right)}$$

wherein:

T is a predetermined time interval
$s$ is the LaPlace operator and
$k$ is selectively every odd integer between 1 and $2n+1$, the transfer function between said input terminal and the other output terminal of said $k^{\text{th}}$ network being $$\frac{V_{\text{in}}}{I_{\text{ck}}}=\frac{1}{R}\left[\frac{\dfrac{4}{t}\cdot\dfrac{1s}{s^2+\dfrac{k^2\pi^2}{T^2}}}{1+\Sigma_{n,\,\text{odd}}\left(\dfrac{\dfrac{4s}{t}}{s^2+\dfrac{n^2\pi^2}{T^2}}\right)}\right]$$

and means for deriving a separate output signal in response to the voltage at each of said one input terminals, and means for deriving a separate output signal in response to the current flowing through each of said other output terminals.

2. The combination of claim 1 wherein a single resistor having value R is connected between each of said networks and said input terminal and the $k^{\text{th}}$ one of said networks comprises a series resonant circuit having a capacitance with value $C_k$ and inductance $L_k$, where $$L_k=\frac{TR}{4}$$

and $$C_k=\frac{4T}{k^2\pi^2 R}$$

3. The combination of claim 1 wherein a single resistor having value R is connected between said input termianl and each of said networks, the $k^{\text{th}}$ one of said network comprising; a series resonant circuit having capacitance with value $C_{k0}$, inductance with value $L_{k0}$ and tuned to $\omega_0$, said series resonant circuit being in series with a parallel resonant circuit having capacitance with value $C_{k1}$, inductance with value $L_{k1}$ and tuned to $\omega_0$, where:

$$L_{k0}=\frac{TR}{8}$$

$$C_{k0}=\frac{8}{TR\omega_0^2}$$

$$L_{k1}=\frac{2T}{k^2\pi^2 R}$$

and $$C_{k1}=\frac{k^2\pi^2 R}{2\omega_0^2 T}$$

4. The combination of claim 1 including means for linearly combining the signals deriving from said $2n$ output terminals.

5. The combination of claim 1 wherein each of said networks includes active elements for deriving at least a portion of said transfer functions, the only reactances in each of said network being capacitors.

6. In a system for indicating a match between an input waveform having period T and a predetermined waveform, comprising an input terminal responsive to said input waveform, $n$ networks responsive to said waveform at said input terminal, each of said networks having a pair of output terminals, the transfer function between said input terminal and one of the output terminals of the $k^{\text{th}}$ one of said networks being $$Q_1(s)=\frac{\dfrac{1}{s^2+\dfrac{k^2\pi^2}{T^2}}}{1+\Sigma_{n,\,\text{odd}}\left(\dfrac{4s}{s^2+\dfrac{n^2\pi^2}{T^2}}\right)}$$

where:

*s* is the LaPlace operator and

*k* is selectively every odd integer between 1 and $2n+1$, the transfer function between said input terminal and the other output terminal of said $k^{th}$ network being $$Q_2(s) = \frac{1}{R} \left[ \frac{\frac{4}{T} \cdot \frac{1s}{s^2 + \frac{k^2\pi^2}{T^2}}}{1 + \Sigma_{n, \text{ odd}} \left( \frac{\frac{4s}{T}}{s^2 + \frac{n^2\pi^2}{T^2}} \right)} \right]$$

means for linearly combining the signals deriving from said output terminals through $2n$ variable gain channels, the gains of said channels being selected to be the same as the Fourier coefficients of the odd harmonics of said input waveform.

7. A system having its response matched to a repetitively occurring waveform of period T, which waveform is subject to variation from one occurrence to another comprising, a network responsive to said waveform for deriving the Fourier coefficients of its odd periodic expansion during each of its occurrence times, a plurality of variable gain channels, each responsive to one of said coefficients, means for linearly combining the signals deriving from said channels, means responsive to said coefficients for deriving control signals indicative of the match between the output of said combining means and each waveform occurrence, and means responsive to said control signal for controlling the gains of said channels.

8. The system of claim 7 wherein said network comprises an input terminal responsive to said waveform, $n$ networks responsive to the waveform at said input terminal, each of said networks having a pair of output terminals, the transfer function between said input terminal and one of the output terminals of the $k^{th}$ one of said networks being $$Q_1(s) = \frac{\frac{1}{s^2 + \frac{k^2\pi^2}{T^2}}}{1 + \Sigma_{n, \text{ odd}} \left( \frac{4s}{s^2 + \frac{n^2\pi^2}{T^2}} \right)}$$

where:

T is a predetermined time interval

*s* is the LaPlace operator and

*k* is selectively every odd integer between 1 and $2n+1$, the transfer function between said input terminal and the other output terminal of said $k^{th}$ network being $$Q_2 = \frac{1}{R} \left[ \frac{\frac{4}{T} \cdot \frac{1s}{s^2 + \frac{k^2\pi^2}{T^2}}}{1 + \Sigma_{n, \text{ odd}} \left( \frac{\frac{4s}{t}}{s^2 + \frac{n^2\pi^2}{T^2}} \right)} \right]$$

9. A signal-matched filter network for band-limited waveforms constituting finite functions of time, comprising:

an input terminal for receiving signal to be matched by said network, a plurality of filter sections coupled to said input terminal for response to said received signal, each of said filter sections having a different resonant frequency from the other filter sections, related to a respective odd harmonic Fourier coefficient of the received signal, each of said filter sections including a frequency determining element, means coupled to each of said filter sections for detecting the voltage across said element and for generating respective voltages related thereto, further means coupled to each of said filter sections for detecting the current through said element and for generating respective voltages related thereto, means for combining the generated voltages as Fourier coefficients of the received signal, and means for supplying said generated voltages to said combining means, including means for varying the magnitudes of said generated voltages to approximate a desired impulse response of said network corresponding to a desired signal match.

10. The invention according to claim 9 wherein is further included means for synchronizing the operation of said filter network with the variation of said signal at preselected time intervals.

11. The invention according to claim 9 wherein said means for varying the magnitudes of said generated voltages comprises means responsive to previously analyzed Fourier coefficients of the signal from which the received signal is derived.

12. The combination according to claim 9 wherein said means for varying the magnitudes of said generated voltages comprises means responsive to a comparison of the combined voltages with a predetermined reference level.

13. The combination according to claim 9 wherein said means for varying the magnitudes of said generated voltages comprises means for selectively setting weighted attenuation factors for said voltages in accordance with anticipated Fourier coefficients of said received signal.

14. The invention according to claim 9 further including means responsive to the best match between the combined voltages and the received signal for providing an indication of recognition of the received signal.

15. Apparatus for matching a filter network to any desired incoming signal, comprising a filter network including a plurality of filter sections connected for parallel receipt of said incoming signal, each filter section having a different frequency response related to a respective harmonic Fourier coefficient of the desired signal, means for sampling the voltages developed by each of said filter sections, means for sampling the current through each of said filter sections, means responsive to the sampled current for conversion thereof to a representative voltage, means responsive to the voltages derived from the first-named and last-named sampling means for adjusting the magnitudes thereof in accordance with the desired signal match, and means responsive to the adjusted voltages for combination thereof in a Fourier synthesis to permit comparison of the incoming signal with the signal to be matched.

References Cited

UNITED STATES PATENTS 3,109,070  10/1963  David _____ 179—15.55

FOREIGN PATENTS 586,315  3/1947  Great Britain.

ROBERT L. GRIFFIN, Primary Examiner

ALBERT J. MAYER, Assistant Examiner

U.S. Cl. X.R.

325—32; 179—15.55